(12) United States Patent
Furusawa et al.

(10) Patent No.: US 11,063,324 B2
(45) Date of Patent: Jul. 13, 2021

(54) POSITIVE ELECTRODE WITH LEAD MEMBER FOR ELECTROCHEMICAL DEVICES, METHOD FOR PRODUCING SAME AND ELECTROCHEMICAL DEVICE

(71) Applicant: Panasonic Intellectual Property Management Co., Ltd., Osaka (JP)

(72) Inventors: Shigetaka Furusawa, Kyoto (JP); Yasuyuki Ito, Osaka (JP); Susumu Nomoto, Kyoto (JP); Nao Matsumura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 144 days.

(21) Appl. No.: 16/120,337

(22) Filed: Sep. 3, 2018

(65) Prior Publication Data

US 2018/0375084 A1    Dec. 27, 2018

Related U.S. Application Data

(63) Continuation of application No. PCT/JP2017/006467, filed on Feb. 22, 2017.

(30) Foreign Application Priority Data

Mar. 22, 2016    (JP) .............................. JP2016-057197

(51) Int. Cl.
*H01M 50/531*    (2021.01)
*H01M 4/133*    (2010.01)
(Continued)

(52) U.S. Cl.
CPC .......... *H01M 50/531* (2021.01); *H01G 11/28* (2013.01); *H01G 11/32* (2013.01);
(Continued)

(58) Field of Classification Search
None
See application file for complete search history.

(56) References Cited

U.S. PATENT DOCUMENTS

| | | | |
|---|---|---|---|
| 2011/0070477 A1* | 3/2011 | Fujiwara | H01M 2/26 429/152 |
| 2011/0129730 A1* | 6/2011 | Kasai | H01M 4/625 429/213 |

(Continued)

FOREIGN PATENT DOCUMENTS

| | | |
|---|---|---|
| CN | 103891029 A | 6/2014 |
| JP | 6-104141 | 4/1994 |

(Continued)

OTHER PUBLICATIONS

English Translation of Chinese Search Report dated Dec. 17, 2019 for the related Chinese Patent Application No. 201780018231.7.

(Continued)

*Primary Examiner* — Brian R Ohara
(74) *Attorney, Agent, or Firm* — McDermott Will and Emery LLP

(57) ABSTRACT

An electrochemical device positive electrode with a lead member includes a positive electrode and a lead member attached to the positive electrode. The positive electrode includes a positive current collector, a carbon layer, and an active layer. The carbon layer is disposed on a surface of the positive current collector, and contains a conductive carbon material. The active layer is supported by the positive current collector via the carbon layer disposed between the active layer and the positive current collector, and contains a conductive polymer. The lead member is in contact with the carbon layer.

3 Claims, 3 Drawing Sheets

(51) Int. Cl.
- *H01M 4/1397* (2010.01)
- *H01M 4/36* (2006.01)
- *H01M 4/62* (2006.01)
- *H01M 4/66* (2006.01)
- *H01G 11/28* (2013.01)
- *H01G 11/32* (2013.01)
- *H01G 11/48* (2013.01)
- *H01G 11/58* (2013.01)
- *H01G 11/66* (2013.01)
- *H01G 11/74* (2013.01)
- *H01G 11/86* (2013.01)
- *H01G 11/06* (2013.01)
- *H01M 4/1393* (2010.01)

(52) U.S. Cl.
CPC ............ *H01G 11/48* (2013.01); *H01G 11/58* (2013.01); *H01G 11/66* (2013.01); *H01G 11/74* (2013.01); *H01G 11/86* (2013.01); *H01M 4/133* (2013.01); *H01M 4/1393* (2013.01); *H01M 4/366* (2013.01); *H01M 4/624* (2013.01); *H01M 4/625* (2013.01); *H01M 4/663* (2013.01); *H01M 4/667* (2013.01); *H01G 11/06* (2013.01)

(56) References Cited

U.S. PATENT DOCUMENTS

| | | |
|---|---|---|
| 2014/0220438 A1 | 8/2014 | Abe et al. |
| 2014/0287319 A1 | 9/2014 | Katsura et al. |
| 2015/0213967 A1 | 7/2015 | Yokouchi et al. |

FOREIGN PATENT DOCUMENTS

| | | |
|---|---|---|
| JP | 2006-279078 | 10/2006 |
| JP | 2008-091585 | 4/2008 |
| JP | 2012-226961 | 11/2012 |
| JP | 2013-110098 A | 6/2013 |
| JP | 2013-145761 | 7/2013 |
| JP | 2013-232388 | 11/2013 |
| JP | 2014-143380 A | 8/2014 |
| WO | 2014/034113 A1 | 3/2014 |

OTHER PUBLICATIONS

International Search Report of PCT application No. PCT/JP2017/006467 dated May 23, 2017.

* cited by examiner

POSITIVE ELECTRODE WITH LEAD MEMBER FOR ELECTROCHEMICAL DEVICES, METHOD FOR PRODUCING SAME AND ELECTROCHEMICAL DEVICE

RELATED APPLICATIONS

This application is a continuation of the PCT International Application No. PCT/JP2017/006467 filed on Feb. 22, 2017, which claims the benefit of foreign priority of Japanese patent application No. 2016-057197 filed on Mar. 22, 2016, the contents all of which are incorporated herein by reference.

BACKGROUND

1. Technical Field

The present disclosure relates to an electrochemical device that includes an active layer containing a conductive polymer.

2. Description of the Related Art

In recent years, an electrochemical device having property intermediate between a lithium ion secondary battery and an electric double layer capacitor attracts attention. For example, use of a conductive polymer as a positive electrode material of an electrochemical device is considered (see Unexamined Japanese Patent Publication Nos. 2012-226961 and 2013-232388). As the conductive polymer, polyaniline and polypyrrole are known, for example. Since a positive electrode containing a conductive polymer allows the Faraday reaction to proceed in association with adsorption (doping) and desorption (dedoping) of an anion, the positive electrode has small reaction resistance and has higher output than output of a positive electrode of a general lithium ion secondary battery.

The positive electrode including a conductive polymer is produced by forming a carbon layer and a conductive polymer layer in this order on a surface of a positive current collector. When a lead member is attached to the positive current collector, a process for removing the conductive polymer layer and the carbon layer from the positive current collector is performed to expose part of the surface of the positive current collector (See Unexamined Japanese Patent Publication No. 2013-232388).

SUMMARY

An electrochemical device positive electrode with a lead member according to a first aspect of the present disclosure includes a positive electrode and a lead member attached to the positive electrode. The positive electrode includes a positive current collector, a carbon layer, and an active layer. The carbon layer is formed on a surface of the positive current collector, and contains a conductive carbon material. The active layer is supported by the positive current collector via the carbon layer disposed between the active layer and the positive current collector, and contains a conductive polymer. The lead member is in contact with the carbon layer.

An electrochemical device according to a second aspect of the present disclosure includes the electrochemical device positive electrode with a lead member, a negative electrode, and a nonaqueous electrolytic solution.

A method for producing an electrochemical device positive electrode with a lead member according to a third aspect of the present disclosure includes following first to fourth steps. The first step is forming a first intermediate body by forming, on a surface of a positive current collector, a carbon layer containing a conductive carbon material. The second step is forming a second intermediate body by making the positive current collector support an active layer containing conductive polymer via the carbon layer disposed between the positive current collector and the active layer. The third step is exposing part of the carbon layer by removing part of the active layer from the second intermediate body. The fourth step is attaching a lead member so as to be in contact with the part of the carbon layer which is exposed.

According to the present disclosure, it is possible to increase reliability in the positive electrode without damaging the positive current collector. In addition, adhesiveness between the lead member and the positive current collector is improved.

DETAILED DESCRIPTION OF EMBODIMENT

Figure 1A:
FIG. 1A is a schematic view illustrating a step of a method for producing an electrochemical device positive electrode with a lead member according to an exemplary embodiment of the present disclosure.

In the conventional electrochemical device described above, it is likely to damage an exposed surface of the positive current collector or damage the carbon layer and the conductive polymer layer in the process of exposing part of the surface of the positive current collector.

An electrochemical device positive electrode with a lead member according to the present disclosure includes a positive electrode and a lead member attached to the positive electrode. The positive electrode includes a positive current collector, a carbon layer formed on a surface of the positive current collector, and an active layer supported by the positive current collector via the carbon layer disposed between the active layer and the positive current collector.

The carbon layer contains a conductive carbon material. The active layer contains a conductive polymer.

The lead member is attached to the positive electrode so as to be in contact with the carbon layer. That is, the positive electrode includes an exposed surface of the carbon layer which is exposed from the active layer. And a flat surface of the lead member is in surface contact with the exposed surface. A conductive carbon material is exposed at the exposed surface to form a conduction path between the lead member and the positive current collector. The exposed surface of the carbon layer is formed by, for example, removing at least part of the active layer. A proportion of contact area between the flat surface of the lead member and the carbon layer in facing area between the lead member and the positive electrode is preferably more than or equal to 3%, for example.

By attaching the lead member so as to be in contact with the carbon layer, the contact resistance is reduced in comparison with a case where the lead member is attached to a surface of the active layer (conductive polymer). Further, adhesiveness between the lead member and the positive current collector is improved due to the interposition of the carbon layer so that connection strength between the lead member and the positive current collector is increased. In the meantime, the active layer (conductive polymer) may partially remain between the lead member and the carbon layer unless it interferes with contact between the lead member and the carbon layer.

The carbon layer may include a composite region of the conductive carbon material and the conductive polymer. In the composite region, the conductive carbon material that forms the carbon layer is mixed with the conductive polymer, for example. When the lead member is brought into contact with the composite region, the adhesiveness between the lead member and the positive current collector can be further improved, and the connection strength is further increased.

The carbon layer interposed between the lead member and the positive current collector has a thickness of preferably less than or equal to 5 μm, more preferably less than or equal to 3 μm, for example. A carbon layer that is partially removed to become thin is not particularly distinguished and is also referred to as the carbon layer.

Next, one example of a method for producing an electrochemical device positive electrode with a lead member according to the present disclosure is described with reference to FIGS. 1A to 1E. FIGS. 1A to 1E are views for illustrating a series of steps of the method for producing a positive electrode.

Figure 1B:
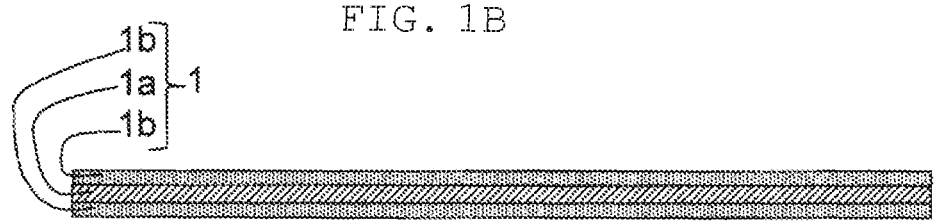
FIG. 1B is a schematic view illustrating a step of the method for producing an electrochemical device positive electrode with a lead member according to the exemplary embodiment of the present disclosure.

First, sheet-shaped positive current collector 1a is prepared (FIG. 1A). Next, as shown in FIG. 1B, first intermediate body 1 is prepared by forming, on a surface of positive current collector 1a, carbon layer 1b containing a conductive carbon material.

As positive current collector 1a, a sheet-shaped current collector is used, for example. As the sheet-shaped current collector, for example, a metal foil, a metal porous body, a punched metal, and an expanded metal are used. As a material for positive current collector 1a, it is possible to use, for example, aluminum, an aluminum alloy, nickel, and titanium. Among these materials, aluminum and an aluminum alloy are preferably used. The sheet-shaped current collector has a thickness ranging, for example, from 10 μm to 100 μm, inclusive. A surface of positive current collector 1a may be etched for roughening.

Carbon layer 1b is formed by, for example, applying a carbon paste containing the conductive carbon material to the surface of positive current collector 1a to form a coating film and then drying the coating film. The carbon paste is prepared by, for example, mixing the conductive carbon material, a resin component, and water or an organic solvent. Carbon layer 1b may have a thickness ranging, for example, from 1 μm to 20 μm, inclusive.

As the conductive carbon material, it is possible to use, for example, graphite, hard carbon, soft carbon, and carbon black. Among these conductive carbon materials, carbon black is preferable from the viewpoint of facilitating formation of the carbon layer that is thin and excellent in conductivity.

As the resin component, it is possible to use, for example, a fluorine resin and an acrylic resin that are electrochemically stable. As the fluorine resin, for example, polytetrafluoroethylene, polyvinylidene fluoride, and a tetrafluoroethylene-hexafluoropropylene copolymer are used. The fluorine resin, however, is not particularly limited. Used as the acrylic resin are, for example, polyacrylic acid and methacrylic acid.

A ratio of the resin component ranges preferably from 1 part by mass to 60 parts by mass, inclusive, more preferably from 5 parts by mass to 40 parts by mass, inclusive, with respect to 100 parts by mass of the conductive carbon material, for example. The carbon layer containing the resin component within the above range is capable of increasing the connection strength between the lead member and the positive current collector.

Figure 1C:
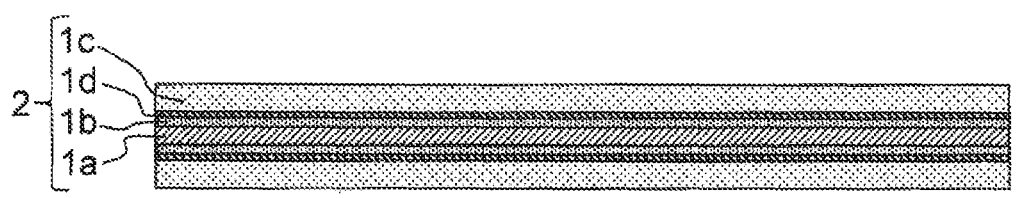
FIG. 1C is a schematic view illustrating a step of the method for producing an electrochemical device positive electrode with a lead member according to the exemplary embodiment of the present disclosure.

Next, as shown in FIG. 1C, second intermediate body 2 is formed by making positive current collector 1a support active layer 1c containing a conductive polymer via carbon layer 1b disposed between the positive current collector and the active layer. Active layer 1c has a thickness ranging, for example, from 50 μm to 300 μm, inclusive. In carbon layer 1b, composite region 1d may be formed where the conductive carbon material is mixed with the conductive polymer. Composite region 1d may constitute part or a whole of carbon layer 1b.

The step of forming second intermediate body 2 can be performed by forming the conductive polymer by electropolymerization. For example, first intermediate body 1 is immersed in a reaction solution containing a raw material monomer, and the raw material monomer is electrolytically polymerized in presence of first intermediate body 1 to form the conductive polymer. At this time, first intermediate body 1 is electrolytically polymerized as an anode to form active layer 1c containing the conductive polymer over a surface of carbon layer 1b.

The raw material monomer easily infiltrates into a gap of the conductive carbon material that forms carbon layer 1b. Accordingly, the electropolymerization performed in the step of forming second intermediate body 2 is capable of easily forming composite region 1d on a surface of carbon layer 1b at a side close to active layer 1c. In composite region 1d, the conductive carbon material is mixed with the conductive polymer.

Composite region 1d, however, can also be formed even when active layer 1c is formed by a method other than the electropolymerization. For example, the conductive polymer may be generated by chemical polymerization. Alternatively, active layer 1c may be formed with use of a dispersion containing the conductive polymer that is prepared in advance. Either of the cases is capable of forming composite region 1d. Further, infiltration of the conductive polymer into whole carbon layer 1b may result in carbon layer 1b that is entirely composite region 1d.

The raw material monomer used in the electropolymerization or the chemical polymerization may be a polymerizable compound capable of forming the conductive polymer by the polymerization. The raw material monomer may include an oligomer. As the raw material monomer, for example, aniline, pyrrole, thiophene, furan, thiophene vinylene, pyridine, and derivatives of these monomers are used. These raw material monomers may be used alone or in combination of two or more of these raw material monomers.

The electropolymerization or the chemical polymerization is preferably performed with use of a reaction solution containing an anion (dopant). This enables easy formation of the active layer that contains the conductive polymer excellent in conductivity. For example, in the chemical polymerization, first intermediate body 1 may be immersed in a reaction solution containing an anion, an oxidant, and the raw material monomer, then picked out from the reaction solution, and dried. On the other hand, in the electropolymerization, first intermediate body 1 and an opposite electrode may be immersed in a reaction solution containing a dopant and the raw material monomer while current is flowed between the first intermediate body 1 and the opposite electrode, with first intermediate body 1 set as an anode and the opposite electrode as a cathode.

As a solvent or a dispersion medium of the reaction solution, water may be used, or a nonaqueous solvent may be used in consideration of solubility of a monomer. As the nonaqueous solvent, for example, alcohols such as ethyl alcohol, methyl alcohol, isopropyl alcohol, ethylene glycol, and poloprene glycol are preferably used.

Examples of the dopant include a sulfate ion, a nitrate ion, a phosphate ion, a borate ion, a benzenesulfonate ion, a naphthalenesulfonate ion, a toluenesulfonate ion, a methanesulfonate ion ($CF_3SO_3^-$), a perchlorate ion ($ClO_4^-$), a tetrafluoroborate ion ($BF_4^-$), a hexafluorophosphate ion ($PF_6^-$), a fluorosulfate ion ($FSO_3^-$), a bis(fluorosulfonyl) imide ion ($N(FSO_2)_2^-$), and a bis(trifluoromethanesulfonyl) imide ion ($N(CF_3SO_2)_2^-$). These dopants may be used alone or in combination of two or more of these dopants.

The dopant may be a polymer ion. Examples of the polymer ion include ions of polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. These polymers may be a homopolymer or a copolymer of two or more monomers. These polymer ions may be used alone or in combination of two or more of these polymer ions.

The reaction solution is preferably controlled to have a pH ranging from 0 to 4 and a temperature ranging from 0° C. to 45° C. Current density during the electropolymerization preferably ranges from 1 mA/cm² to 100 mA/cm², inclusive. The reaction solution preferably has the raw material monomer dissolved at a rate ranging from 0.1 mol/L to 3 mol/L, inclusive. The reaction solution desirably has an anion concentration ranging from 0.1 mol/L to 5 mol/L, inclusive.

The conductive polymer formed by the electropolymerization or the chemical polymerization is preferably a π-conjugated polymer. And a π-electron conjugated polymer exhibits excellent conductivity by doping with an anion (dopant). As the π-conjugated polymer, it is possible to use, for example, polypyrrole, polythiophene, polyfuran, polyaniline, polythiophene vinylene, polypyridine, and derivatives of these polymers. These π-conjugated polymers may be used alone or in combination of two or more of these π-conjugated polymers. A weight-average molecular weight of the conductive polymer is not particularly limited and ranges, for example, from 1000 to 100000, inclusive.

Derivatives of polypyrrole, polythiophene, polyfuran, polyaniline, polythiophene vinylene, and polypyridine mean polymers having, as a basic skeleton, polypyrrole, polythiophene, polyfuran, polyaniline, polythiophene vinylene, and polypyridine, respectively. For example, a polythiophene derivative includes poly(3,4-ethylenedioxythiophene) (PEDOT) and the like.

Figure 1D:
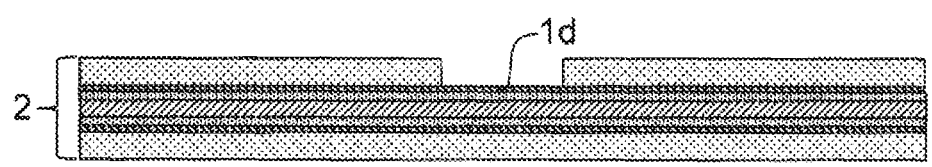
FIG. 1D is a schematic view illustrating a step of the method for producing an electrochemical device positive electrode with a lead member according to the exemplary embodiment of the present disclosure.
Figure 1E:
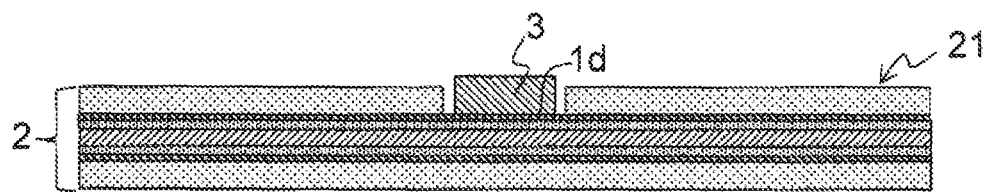
FIG. 1E is a schematic view illustrating a step of the method for producing an electrochemical device positive electrode with a lead member according to the exemplary embodiment of the present disclosure.

Next, as shown in FIG. 1D, part of active layer 1c is removed from second intermediate body 2 to expose part of composite region 1d in carbon layer 1b. At this time, part of carbon layer 1b may be removed. Subsequently, lead member 3 is attached to an exposed surface of composite region 1d in carbon layer 1b (FIG. 1E) so as to be in contact with the conductive carbon material. At this time, part of active layer 1c may remain between lead member 3 and positive current collector 1a.

In FIG. 1D, lead member 3 has been attached by bringing the lead member into contact with composite region 1d. When a ground region of carbon layer 1b exists where no conductive polymer is mixed, lead member 3 may be attached by bringing the lead member into contact with the ground region of carbon layer 1b that is exposed by removing at least part of composite region 1d.

Figure 2:
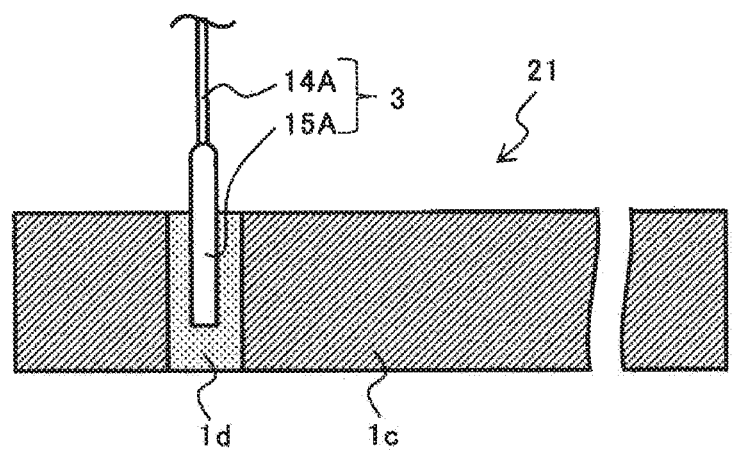
FIG. 2 is a top view illustrating electrochemical device positive electrode with a lead member according to an exemplary embodiment of the present disclosure.

Then, a method such as resistance welding or penetration boring for lead member 3 and positive current collector 1a is performed so that positive electrode 21 with lead member 3 shown in FIG. 2 is formed.

In the resistance welding, it is possible to weld lead member 3 to a surface of positive current collector 1a via carbon layer 1b or composite region 1d interposed between the lead member and the positive current collector. Hence, as a conduction path, a path where the lead member is in direct contact with the positive current collector is formed. Accordingly, power collection property of lead member 3 significantly increases.

In the penetration boring, boring is performed so as to sequentially penetrate lead member 3 and positive current collector 1a from one surface of positive electrode 21, for example. In the boring, a burr is formed as a protrusion on lead member 3. The protrusion passes through a hole formed on positive current collector 1a by the boring. A tip of the protrusion is crushed and swaged to the other surface of positive electrode 21 for locking to enable attachment of lead member 3 to positive electrode 21.

FIG. 2 is a top view illustrating positive electrode 21 to which lead member 3 is attached. In an example shown in the drawing, lead member 3 is formed of lead wire 14A and lead tab 15A. Lead tab 15A includes a flat surface that is in surface contact with the exposed surface of carbon layer 1b or composite region 1d for connection with positive current collector 1a.

FIGS. 1A to 1E have shown a case of exposing carbon layer 1b or composite region 1d on one surface of the positive current collector. Carbon layer 1b or composite region 1d, however, may be exposed on both surfaces of the positive, current collector, and positions of exposed surfaces may be different on the front and back surfaces of the positive current collector. A position or a size of lead member 3 can be appropriately determined according to a size or a shape an electrochemical device.

Next, one example of an electrochemical device according to the present disclosure is described with reference to FIGS. 3 and 4.

Figure 3:
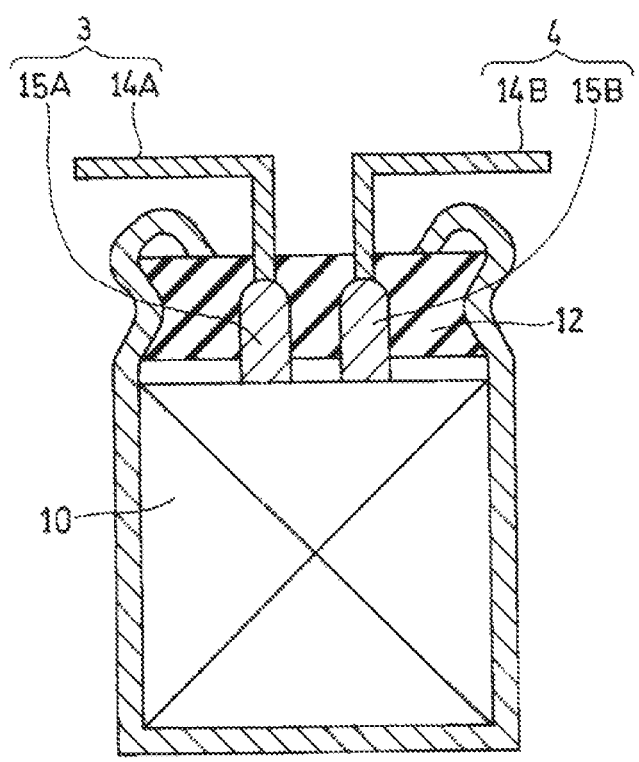
FIG. 3 is a schematic sectional view illustrating one example of an electrochemical device according to the present disclosure.
Figure 4:
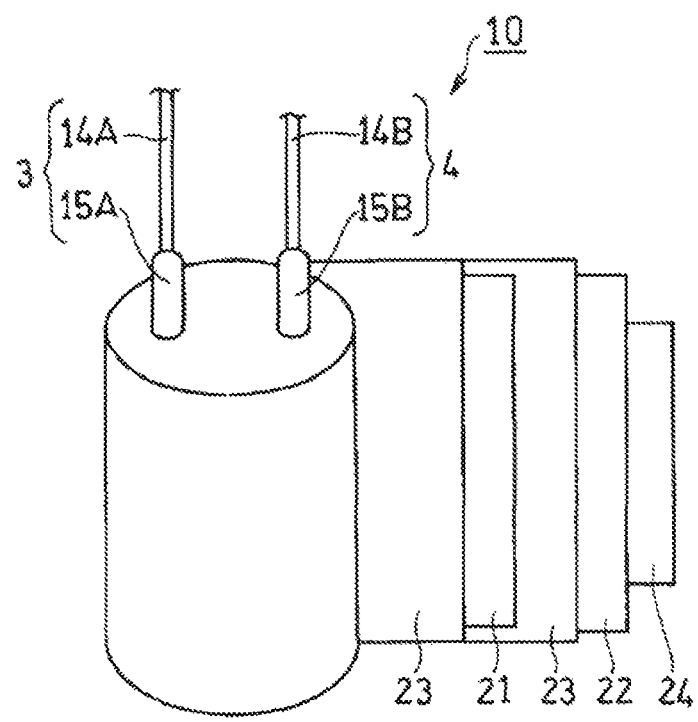
FIG. 4 is a schematic view illustrating an internal configuration of the electrochemical device shown in FIG. 3.

FIG. 3 is a schematic sectional view illustrating one example of the electrochemical device, and FIG. 4 is a schematic developed view of part of the electrochemical device. Electrode group 10 is a wound body shown in FIG. 4 and includes positive electrode 21, negative electrode 22, and separator 23 disposed between the positive electrode and the negative electrode. An outermost periphery of the wound body is fixed with fastening tape 24. Lead member 3 (lead wire 14A and lead tab 15A) is connected to positive electrode 21, and lead member 4 (lead wire 14B and lead tab 15B) is connected to negative electrode 22. The electrochemical device includes electrode group 10, bottomed case 11 housing electrode group 10, sealing body 12 for closing an opening of bottomed case 11, lead members 3,4 led out from sealing body 12, and a nonaqueous electrolytic solution (not shown). Sealing body 12 is formed of, for example, an elastic material containing a rubber component. Bottomed case 11 is, at a part near an opening end, processed inward by drawing, and is, at the opening end, curled to swage sealing body 12.

In the exemplary embodiment described above, a wound electrochemical device having a cylindrical shape has been described. An application range of the present disclosure, however, is not limited to the wound electrochemical device and the present disclosure can also be applied to a square-shaped electrochemical device or a stacked electrochemical device equipped with the electrode group having a configuration where the positive electrode and the negative electrode are stacked with the separator interposed between the positive electrode and the negative electrode.

Next, constituents other than the positive electrode of the electrochemical device are described.

(Negative Electrode)

The negative electrode includes, for example, a negative current collector and a negative electrode material layer.

As the negative current collector, a conductive sheet material is used, for example. As the sheet material, for example, a metal foil, a metal porous body, a punched metal, a an etched metal are used. As a material for the negative current collector, it is possible to use, for example, copper, a copper alloy, nickel, and stainless steel.

The negative electrode material layer preferably contains, as a negative electrode active material, a material that electrochemically stores and releases lithium ions. Examples of such a material include a carbon material, a metal compound, an alloy, and a ceramic material. As the carbon material, graphite, non-graphitizable carbon (hard carbon), and easily graphitizable carbon (soft carbon) are preferable, and graphite and hard carbon are particularly preferable. Examples of the metal compound include silicon oxide and tin oxide. Examples of the alloy include a silicon alloy and a tin alloy. Examples of the ceramic material include lithium titanate and lithium manganate. These materials may be used alone or in combination of two or more of these materials. Among these materials, a carbon material is preferable that is capable of achieving low potential of the negative electrode.

The negative electrode material layer preferably contains, for example, a conducting agent and a binder besides the negative electrode active material. Examples of the conducting agent include carbon black and a carbon fiber. Examples of the binder include a fluorine resin, an acrylic resin, a rubber material, and a cellulose derivative. Examples of the fluorine resin include polyvinylidene fluoride, polytetrafluoroethylene, and a tetrafluoroethylene-hexafluoropropylene copolymer. Examples of the acrylic resin include polyacrylic acid and an acrylic acid-methacrylic acid copolymer. Examples of the rubber material include a styrene-butadiene rubber, and examples of the cellulose derivative include carboxymethyl cellulose.

The negative electrode material layer is formed by, for example, preparing a negative electrode mixture paste that contains a mixture of a negative electrode active material, a conducting agent, a binder, and the like with a dispersion medium and applying the negative electrode mixture paste to the negative current collector, followed by drying. For the dispersion medium, water or N-methyl-2-pyrrolidone (NMP) is preferably used, for example. Subsequently, a coating film is preferably pressed between rollers in order to enhance strength of the negative electrode material layer.

The negative electrode is preferably pre-doped with lithium ions in advance. This lowers potential of the negative electrode to increase a difference in potential between the positive electrode and the negative electrode (that is, voltage). And thus energy density of an electrochemical device can be improved.

Pre-doping of the negative electrode with lithium ions is advanced by, for example, forming a metal lithium film that serves as a supply source of lithium ions on a surface of the negative electrode material layer and impregnating the negative electrode having the metal lithium film with a nonaqueous electrolytic solution having lithium ion conductivity. At this time, lithium ions are eluted from the metal lithium film into the nonaqueous electrolytic solution and the eluted lithium ions are stored in the negative electrode active material.

(Nonaqueous Electrolytic Solution)

The nonaqueous electrolytic solution contains a lithium salt and a nonaqueous solvent that dissolves the lithium salt. An anion derived from the lithium salt reversibly repeats doping and dedoping and from the positive electrode in association with charging and discharging of an electrochemical device. On the other hand, a lithium ion derived from the lithium salt is stored in the negative electrode or released from the negative electrode in association with charging and discharging of the electrochemical device.

Examples of the lithium salt include $LiClO_4$, $LiBF_4$, $LiPF_6$, $LiAlCl_4$, $LiSbF_6$, $LiSCN$, $LiCF_3SO_3$, $LiFSO_3$, $LiCF_3CO_2$, $LiB_{10}Cl_{10}$, $LiCl$, $LiBr$, $LiI$, $LiBCl_4$, $LiN(FSO_2)_2$, and $LiN(CF_3SO_2)_2$. These lithium salts may be used alone or in combination of two or more of these lithium salts. Concentration of the lithium salt in the nonaqueous electrolytic solution may range, for example, from 0.2 mol/L to 4 mol/L, inclusive and is not particularly limited.

As the nonaqueous solvent, it is possible to use, for example, cyclic carbonates such as ethylene carbonate, propylene carbonate, and butylene carbonate; chain carbonates such as dimethyl carbonate, diethyl carbonate, and ethyl methyl carbonate; aliphatic carboxylate esters such as methyl formate, methyl acetate, methyl propionate, and ethyl propionate; lactone, such as γ-butyrolactone and γ-valerolactone; chain ethers such as 1,2-dimethoxyethane (DME), 1,2-diethoxyethane (DEE) and ethoxymethoxyethane (EME); cyclic ethers such as tetrahydrofuran and 2-methyltetrahydrofuran; dimethylsulfoxide, 1,3-dioxolane, formamide, acetamide, dimethylformamide, dioxolane, acetonitrile, propionitrile, nitromethane, ethylmonoglyme, trimethoxymethane, sulfolane, methyl sulfolane, and 1,3-propanesultone. These nonaqueous solvents may be used alone or in combination of two or more of these nonaqueous solvents.

(Separator)

As the separator, for example, a nonwoven fabric made of cellulose fiber, a nonwoven fabric made of glass fiber, a microporous membrane made of polyolefin, a fabric cloth, and a nonwoven fabric are preferably used. The separator has a thickness ranging, for example, from 10 μm to 300 μm, inclusive, preferably from 10 μm to 40 μm, inclusive.

An electrochemical device according to the present disclosure can be suitably used for application where required capacitance is higher than capacitance of an electric double layer capacitor or a lithium ion capacitor and required output is higher than output of a lithium ion secondary battery.

What is claimed is:

1. An electrochemical device positive electrode with a lead member, the electrochemical device positive electrode comprising:
   a positive electrode; and
   a lead member attached to the positive electrode, wherein:
   the positive electrode includes:
      a positive current collector;
      a carbon layer that is disposed on a surface of the positive current collector, the carbon layer containing a conductive carbon material; and
      an active layer that covers the carbon layer, the active layer containing a conductive polymer that is supported by the positive current collector via the carbon layer,
   the carbon layer has an exposed surface that is exposed from the active layer,
   the carbon layer includes a composite region of the conductive carbon material and the conductive polymer, and
   the lead member is attached on the exposed surface of the carbon layer to be in contact with the composite region of the carbon layer.

2. The electrochemical device positive electrode with a lead member according to claim 1, wherein the carbon layer disposed between the lead member and the positive current collector has a thickness of less than or equal to 5 μm.

3. An electrochemical device comprising:
   the electrochemical device positive electrode with a lead member according to claim 1;
   a negative electrode; and
   a nonaqueous electrolytic solution.

* * * * *